May 11, 1965

J. D. FROST 3,182,827

OBJECT CONVEYING CHUTE

Filed Jan. 10, 1964

JAMES DAHLE FROST
INVENTOR

Huebner & Worrel
ATTORNEYS

May 11, 1965  J. D. FROST  3,182,827
OBJECT CONVEYING CHUTE
Filed Jan. 10, 1964  2 Sheets-Sheet 2

JAMES DAHLE FROST
INVENTOR
Huebner & Worrel
ATTORNEYS

United States Patent Office 3,182,827
Patented May 11, 1965

3,182,827
OBJECT CONVEYING CHUTE
James Dahle Frost, P.O. Box 775, Porterville, Calif.
Filed Jan. 10, 1964, Ser. No. 336,997
2 Claims. (Cl. 214—83.1)

The present invention relates to an object conveying chute for a mobile scaffold having a worker support platform thereon capable of elevational and horizontal rotational movement adjacent to workpieces, such as trees in an orchard, and more particularly to such a conveying chute which maintains a continuously declining attitude from the platform in substantially all elevational positions of the platform to insure free gravitational descent of objects downwardly within the chute.

Mobile scaffolds having elevatable worker support platforms thereon are frequently employed for picking fruit in orchards. Such scaffolds are controlled by a worker on the platform who conventionally carries a picking sack or bucket for ready deposit and accumulation of harvested fruit. Such practice requires that the worker must frequently lower the platform and dismount therefrom in order to unload. Unproductive time spent by the worker in dismounting, unloading the fruit into collection containers and remounting disrupts the working process to such a substantial degree that the inherent advantage of having a worker positioned on a mobile elevatable work platform is substantially lost. In order to maintain the worker on the platform, an additional worker is required on the ground to receive and empty the picking sack. This increase in manpower thus offsets the savings from use of the mobile platform. Furthermore, such frequent dismounting by the worker from the platform increases the possibility of accidental injury to the worker and to the fruit. Furthermore, mobile scaffolds having a platform equipped with a mechanical picker such as covered by my copending application Serial No. 211,682, entitled "Article Handling Apparatus" are subject, to an even greater degree, to the same problems. Such mechanical pickers usually suspend a relatively small object collecting container beneath the platform. However, the picker discharges objects at such high speed and volume that the container is rapidly filled requiring even more frequent lowering of the platform to empty the container than is necessary with manual picking.

A broad object of the present invention is, therefore, to provide an object conveying chute for a mobile scaffold.

Another object is to provide an object conveying chute for a mobile scaffold having an elevatable work platform thereon which effectively removes objects from the platform in all elevational positions thereof.

Another object is to provide a conveying chute of the character described which has an object receiving portion readily accessible to a worker on the platform.

Another object is to provide an object conveying chute which deposits the objects at a position adjacent to the ground.

Another object is to provide an object conveying chute for a mobile scaffold which is capable of maintaining a declining relationship from the platform in substantially all elevational positions of the platform.

Another object is to provide such a declining conveying chute for removing objects, such as fruit and the like, from the platform which is capable of gently discharging such fruit with a minimum of damage thereto.

Another object is to provide a conveying chute which decelerates the discharge of fruit therefrom and directs such fruit into a collecting container adjacent to the ground in substantially all operational positions of the platform.

Another object is to provide a conveying chute which shields fruit therein against harmful contact with overhanging branches and the like.

Another object is to provide a conveying chute for a mobile scaffold which accommodates a plurality of fruit transversely thereof without clogging.

Other objects and advantages of the present invention will become more fully apparent in the subsequent description in the specification.

Figure 1:
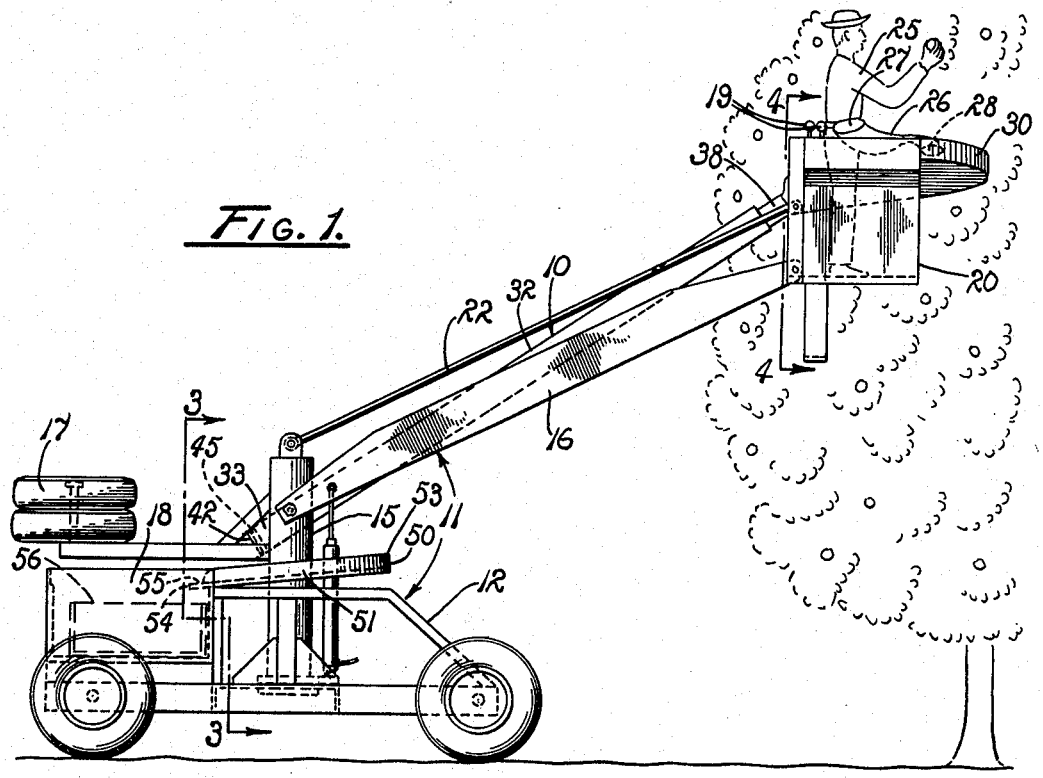
FIG. 1 is a side elevation of a mobile scaffold mounting the fruit conveying chute of the present invention.

Referring in greater detail to the drawings, a fruit conveying chute 10 embodying the principles of the present invention is mounted on a mobile scaffold 11. The mobile scaffold provides a wheeled vehicle 12 having a substantially upright tubular swivel column 15 which pivotally mounts an elevatable elongated boom 16. The boom is counterbalanced by a counterweight 17 for 360° rotation about the column. A fruit collecting bin 18 is mounted on the vehicle adjacent to the column beneath the boom and the counterweight.

A picking or worker support platform 20 is pivotally mounted on the extended end of the boom 16 which is provided with controls 19 connected to suitable powered members on the vehicle for maneuvering the vehicle and positioning the boom and platform. The platform maintains continuous horizontal orientation in all elevational positions of the boom by a system of parallelogram linkages formed by the boom and a tie rod 22 disposed in interconnecting relation between the platform and the column in spaced parallel relation to the boom. The platform 20 is adapted to support a worker 25 thereon who is provided with a picking sack 26 having opposite fruit receiving and discharging ends 27 and 28, respectively. Alternatively, the platform may mount the mechanical picker of my above mentioned copending application or any other suitable mechanical picking device.

The conveying chute 10 includes an upper arcuate fruit receiving trough portion 30, an intermediate rectilinear covered portion 32 and a lower discharge end portion 33. The chute provides opposite substantially continuous side walls 36 transversely spaced a sufficient distance to allow free passage of a plurality of fruit therebetween without clogging. It is found satisfactory to space the walls slightly over three times the distance of the maximum diameter of fruit to be conveyed by the chute. The upper fruit receiving portion of the chute is disposed above the extended end of the boom and is attached, as by welding or the like, to the platform 20 in fixed arcuately declining relation therefrom. The intermediate portion 32 of the chute is similarly mounted on the boom 16 in declining relation from the upper fruit receiving portion and in oblique angular relation to the boom so that the lower discharge end portion is disposed below the boom adjacent to the column 15 on the vehicle 12.

In order to accommodate pivotal movement of the platform 20 relative to the boom a bridging member 38 is pivotally mounted on the upper fruit receiving portion 30 of the chute 10 by a pair of hinges 39 and is telescopically extended into the intermediate portion 32 of the chute in continuous bridging relation in all elevational positions of the platform. Such mounting of the chute insures free gravitational descent of fruit downwardly therethrough in substantially all operating positions of the boom even when the boom is lowered below a horizontal position.

Figure 2:
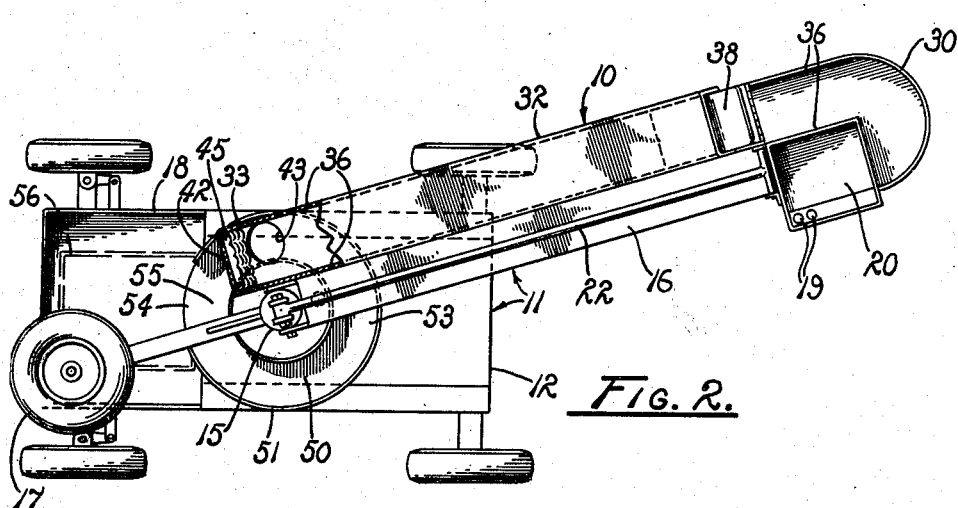
FIG. 2 is a top plan view of the mobile scaffold and conveying chute of FIG. 1.
Figure 3:
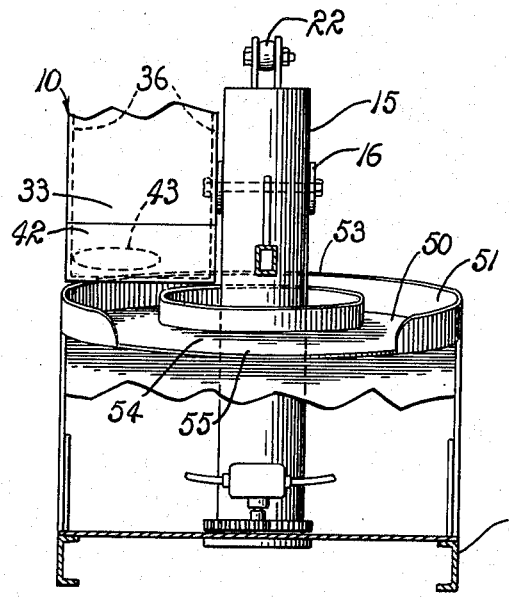
FIG. 3 is a somewhat enlarged, vertical section through the mobile scaffold taken on line 3—3 of FIG. 1 showing the discharge end of the chute adjacent to a fruit gathering tray on the mobile scaffold.
Figure 4:
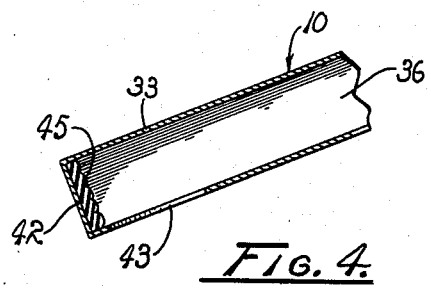
FIG. 4 is a somewhat enlarged, longitudinal section through the discharge end of the chute.
Figure 5:
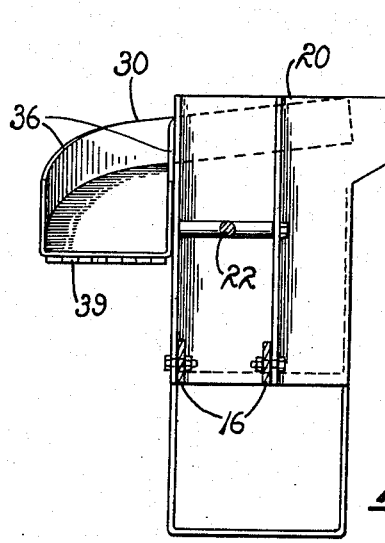
FIG. 5 is a somewhat enlarged, vertical section through the platform support boom of the mobile scaffold taken on line 4—4 of FIG. 1 showing a chute bridging member adjacent to the platform.
Figure 6:
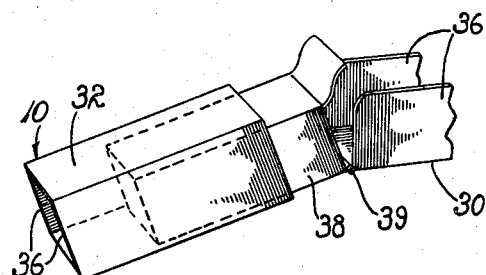
FIG. 6 is a somewhat enlarged side elevation of the bridging member of FIG. 5.

The lower discharge end portion 33 of the chute 10 has an end wall 42 and a downwardly opening fruit discharge outlet 43 disposed adjacent thereto in radially outwardly spaced relation to the column 15 of the vehicle 12. As best shown in FIGS. 2 and 4, a cushion 45 of resiliently flexible material, such as foam rubber or the like, is mounted on the end wall within the chute which serves gently to deflect fruit downwardly through the outlet 43. It is noted that an endless belt conveyor, not shown, having upstanding transverse flight bars could be disposed within the chute 10 when picking easily damaged fruit such as peaches, nectarines, plums and the like for greater control of fruit descent.

A substantially circular fruit gathering tray 50 having an outer side wall 51 is mounted on the vehicle 12 in circumscribing relation to the column 15 beneath and in continuous registry with the discharge outlet 43 from the chute 10 in all elevational and rotational positions of the boom 16 and chute. The tray is disposed in declining relation from an upper side 53 to a lower side 54 wherein the side wall is interrupted to form a fruit spillway 55 above the fruit collecting bin on the vehicle. A fruit packing crate, as indicated in dashed lines at 56, can be placed in the bin 18 beneath the spillway 55, if desired.

*Operation*

The operation of the described embodiment of the subject invention is believed to be readily apparent and is briefly summarized at this point. For operation in orchards, the mobile scaffold 11 is usually positioned between two rows of trees with the worker support platform 20 disposed adjacent to a tree and a worker 25 stationed thereon carrying a picking sack 26 with the bottom end 28 extended into the upper fruit receiving portion 30 of the chute 10, as in FIG. 1. As the fruit is picked, it is deposited into the open upper end 27 of the picking sack through which it funnels into the upper fruit receiving portion of the chute gravitating therealong into the intermediate portion 32. The fruit descends through the intermediate portion until it comes into contact with the cushion 45 on the end wall 42 from which it is deflected gently downwardly through the discharge outlet 43 onto gathering tray 50. The fruit then gravitates downwardly across the gathering tray and over the spillway 55 falling into the fruit packing crate 56 positioned within collecting bin 18.

As the worker 25 proceeds to gather fruit from the tree, the platform 20 is progressively lowered by manipulation of the controls 19 mounted thereon causing the extended end of the boom 16 to swing downwardly. As the platform is lowered, it pivots upwardly relative to the boom and to the intermediate portion 32 of the chute 10 under the influence of the tie rod 22 to maintain continuous horizontal orientation of the platform. The upper fruit receiving portion 30 of the chute maintains continuous declining orientation with the intermediate portion of the chute through the telescopic hinging action of the bridging member 38. As the platform and upper fruit receiving portion are lowered, the bridging member swings on hinges 39 to telescope within the intermediate portion of the chute so as to accommodate such angular relationship between the upper and intermediate portions of the chute without interrupting the continuous fruit passageway therebetween.

When the platform 20 is lowered to a position disposing the outer end of the boom 16 below a horizontal plane in somewhat declining relation from its pivotal mounting on the column 15, the intermediate portion 32 of the chute still maintains its descending attitude from the platform continually to allow gravitational descent of the fruit therein. Such operation is made possible by the obliquely angular X-shaped relation between the intermediate portion of the chute and the boom which disposes the upper end of the chute above the extended end of the boom and the lower discharge portion 33 of the chute below the inner pivotal end of the boom. If the boom is lowered to such an excessive extent that fruit does not gravitationally descend through the chute, it simply accumulates in the fruit receiving portion 30 and chute until the boom is again raised sufficiently for discharge into the gathering tray 50.

In the lowermost positions of the platform 20 the boom 16 may drop substantially below the horizontal plane so that the intermediate portion 32 of the chute may no longer allow gravitational descent of fruit therealong. In this situation, the worker 25 can nevertheless continue to deposit fruit into the picking sack 26 or upper fruit receiving portion 30 of the chute. This is made possible by the upper fruit receiving portion of the chute being fixed continually in declining relation from the platform so that fruit deposited in the upper portion will continue to descend into the intermediate portion as long as space remains therein. The worker can prevent clogging of the intermediate portion by periodically raising the platform so as to allow the previously described gravitational discharge of fruit therefrom.

In view of the foregoing, it is readily apparent that the structure of the present invention has provided a conveying chute for a mobile and rotatable scaffold which is effective gravitationally to discharge fruit in substantially all elevational and rotational positions thereof with a minimum of damage to the fruit. Such descent of fruit is accomplished by the obliquely angular mounting of the chute in X-shaped relation to the boom which maintains its declining relation from the platform of the scaffold even with the outer end of the boom disposed in declining position below a horizontal plane. Furthermore, the lower discharge end of the chute is effective to restrict uncontrolled free flow of fruit therefrom by deflecting the fruit against the cushion 45 so as gently to gravitate through the discharge outlet from the chute.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a mobile orchard scaffold having an elongated boom mounted on a vehicle for elevational movement about a substantially horizontal axis and for rotational movement about a substantially upright axis, said rotational movement having a compass of 360°, said boom providing an outer end pivotally mounting a worker support platform having control means maintaining the platform in continuous horizontal attitude during said elevational movement of the boom; the combination of an elongated conveying chute mounted on the boom for movement therewith having an open upper arcuate fruit receiving trough portion mounted on the platform above the boom, a covered intermediate rectilinear portion declining therefrom for gravitational descent of fruit therethrough, and a lower discharge portion below the boom adjacent to the vehicle so as to insure said gravitational descent of fruit in substantially all elevational positions of the boom, said discharge portion having a downwardly opening fruit outlet with the trough, intermediate and discharge portions of the chute providing substantially continuous side walls transversely spaced a sufficient distance to insure free passage of a plurality of fruit therebetween; means pivotally telescopically connecting said upper trough portion to said intermediate portion of the chute to accommodate pivotal movement between the platform and the boom; a fruit gathering tray mounted on the vehicle in declining circumscribing relation about the axis of rotation of the boom below the lower discharge portion of the chute in continuous registry with said fruit outlet from the chute during said elevational and rotational positioning of the boom and having a spillway opening therefrom for discharging fruit; and container means removably mounted on the vehicle in position to receive fruit discharged from said spillway of the tray.

2. In a mobile orchard scaffold having an elongated boom mounted on a vehicle for elevational movement about a substantially horizontal axis and for rotational movement about a substantially upright axis, said rotational movement having a compass of 360°, said boom providing an outer end pivotally mounting a worker support platform having control means maintaining the platform in continuous horizontal attitude during said elevational movement of the boom; the combination of an elongated conveying chute mounted on the boom for movement therewith having an open upper arcuate fruit receiving trough portion mounted on the platform above the boom, a covered intermediate rectilinear portion declining therefrom for gravitational descent of fruit therethrough, and a lower discharge portion having an end wall below the boom adjacent to the vehicle so as to insure said gravitational descent of fruit in substantially all elevational positions of the boom, said discharge portion having a downwardly opening fruit outlet adjacent to said end wall; cushion means mounted on said end wall within the chute, said trough, intermediate and discharge portions of the chute providing substantially continuous side walls transversely spaced a sufficient distance to insure free passage of a plurality of fruit therebetween with the fruit directed downwardly toward said end wall against said cushion means gently to deflect the fruit downwardly through said outlet from the chute; means pivotally telescopically connecting said upper trough portion to said intermediate portion of the chute to accommodate pivotal movement between the platform and the boom; an annular fruit gathering tray mounted on the vehicle in declining circumscribing relation about the axis of rotation of the boom below the lower discharge portion of the chute in continuous registry with said fruit outlet from the chute during said elevational and rotational positioning of the boom and having a spillway opening therefrom for discharging fruit; powered means for elevating the boom mounted on the vehicle within the compass of the tray; and container means removably mounted on the vehicle in position to receive fruit discharged from said spillway of the tray.

References Cited by the Examiner
UNITED STATES PATENTS

| | | | |
|---|---|---|---|
| 1,094,263 | 4/14 | Stevens | 193—7 |
| 2,348,899 | 5/44 | Guignard et al. | 214—131 |
| 2,674,500 | 4/54 | Hukari | 56—328 |
| 2,798,623 | 7/57 | Girardi | 214—83.1 |
| 2,973,112 | 2/61 | Young | 214—83.1 |
| 3,088,609 | 5/63 | Franzen | 214—83.1 |

HUGO O. SCHULZ, *Primary Examiner.*

GERALD M. FORLENZA, *Examiner.*